United States Patent
Kobayashi et al.

(10) Patent No.: US 6,984,337 B2
(45) Date of Patent: *Jan. 10, 2006

(54) MN—ZN FERRITE CONTAINING LESS THAN 50 MOL% FE2O3

(75) Inventors: Osamu Kobayashi, Iwata-gun (JP); Osamu Yamada, Iwata-gun (JP); Kiyoshi Ito, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 1 day.

This patent is subject to a terminal disclaimer.

(21) Appl. No.: 10/765,050

(22) Filed: Jan. 28, 2004

(65) Prior Publication Data

US 2004/0183048 A1 Sep. 23, 2004

(30) Foreign Application Priority Data

Feb. 12, 2003 (JP) .............................. 2003-033146

(51) Int. Cl.
*C04B 35/38* (2006.01)
*H01F 1/34* (2006.01)
(52) U.S. Cl. ............................. 252/62.62; 252/62.59; 252/62.63
(58) Field of Classification Search ............ 252/62.62, 252/62.59, 62.9, 62.63
See application file for complete search history.

(56) References Cited

U.S. PATENT DOCUMENTS 6,210,598 B1 * 4/2001 Kobayashi et al. ...... 252/62.62
6,461,531 B2 * 10/2002 Kobayashi et al. ...... 252/62.59

FOREIGN PATENT DOCUMENTS

| JP | A 3-108803 | 5/1991 |
| JP | A 7-23090 | 1/1995 |
| JP | A 7-230909 | 8/1995 |
| JP | A 10-208926 | 8/1998 |
| JP | 3108803 B2 | 9/2000 |

* cited by examiner

*Primary Examiner*—C. Melissa Koslow
(74) *Attorney, Agent, or Firm*—Oliff & Berridge, PLC

(57) ABSTRACT

An Mn—Zn ferrite includes base components of 44.0 to 49.8 mol % $Fe_2O_3$, 4.0 to 26.5 mol % ZnO, at least one of 0.1 to 4.0 mol % $TiO_2$ and $SnO_2$, 0.5 mol % or less $Mn_2O_3$, and the remainder consisting of MnO, and contains 0.20 (0.20 excluded) to 1.00 mass % CaO as additive. Since the Mn—Zn ferrite contains less than 50 mol % $Fe_2O_3$ and a limited amount (0.5 mol % or less) of $Mn_2O_3$, an abnormal grain growth does not occur even if CaO content is more than 0.20 mass %, and a high electrical resistance can be gained. And, since an appropriate amount of $TiO_2$ and/or $SnO_2$ is contained, an initial permeability is kept adequately high, whereby an excellent soft magnetism can be achieved in a high frequency band such as 1 MHz.

4 Claims, No Drawings

MN—ZN FERRITE CONTAINING LESS THAN 50 MOL% FE2O3

BACKGROUND OF THE INVENTION

1. Field of the Invention

The present invention relates to a typical oxide magnetic material having soft magnetism, and more particularly to an Mn—Zn ferrite suitable for low-loss materials for use in switching power supplies, various inductance elements, impedance elements for EMI countermeasures, electromagnetic wave absorbers, and so forth.

2. Description of the Related Art

An Mn—Zn ferrite is one of typical oxide magnetic materials having soft magnetism, generally contains base components: more than stoichiometric composition of 50.0 mol %, average 52.0 to 55.0 mol % $Fe_2O_3$; 10.0 to 24.0 mol % ZnO; and the remainder consisting of MnO, and is usually manufactured such that raw material powders of $Fe_2O_3$, ZnO and MnO are weighed for a predetermined compound ratio, mixed, calcined, milled, component-adjusted, granulated, and pressed into green compacts having a predetermined shape, and the green compacts are sintered at a temperature of 1200 to 1400 degrees C. for 2 to 4 hours in a reducing atmosphere with partial pressure of oxygen controlled by charging nitrogen in a furnace in accordance with a formula (1) described below, and are cooled down in the same atmosphere;

$$\log P_{O_2} = -14540/(T+273) + b \quad (1)$$

where T is temperature (degrees C.), $P_{O_2}$ is partial pressure of oxygen, and b is a constant (usually set at 7 to 8).

It is generally known that manganese (Mn) component of an Mn—Zn ferrite can be present as $Mn^{3+}$ or $Mn^{2+}$, an abundance ratio between $Mn^{3+}$ and $Mn^{2+}$ depends on atmospheric partial pressure of oxygen at sintering, and that $Mn^{3+}$ deteriorates soft magnetism of an Mn—Zn ferrite significantly. It is also known that an electron transfer, which occurs between $Mn^{3+}$ and $Mn^{2+}$, causes electrical resistance to lower. Accordingly, in order to manufacture an Mn—Zn ferrite with an excellent soft magnetism and a high electrical resistance, it is essential to control a sintering atmosphere (partial pressure of oxygen) so as to minimize the production of $Mn^{3+}$, and the constant b of the aforementioned formula (1) is set at 7 to 8 in consideration of the essentially together with industrial feasibility. The fact that the constant b is set at 7 to 8 means the partial pressure of oxygen at sintering must be controlled within a narrow range, which makes the sintering process very troublesome pushing up production cost.

In the conventional general Mn—Zn ferrite containing more than 50.0 mol % $Fe_2O_3$, iron (Fe) component can be present as $Fe^{3+}$ or $Fe^{2+}$, and when the Mn—Zn ferrite is sintered in the reducing atmosphere described above, $Fe^{3+}$ is partly reduced to produce $Fe^{2+}$. $Fe^{2+}$ has a positive crystal magnetic anisotropy and cancels out a negative crystal magnetic anisotropy of $Fe^{3+}$ thereby enhancing the soft magnetism, but an electron transfer occurs, like the manganese (Mn) component, between $Fe^{3+}$ and $Fe^{2+}$ thus lowering electrical resistance significantly.

Recently, with more and more electronics equipments coming out in a reduced size with a higher performance, processing signals are formed with a higher frequency, and therefore magnetic materials are required to exhibit excellent magnetic characteristics in a high frequency band. With a magnetic core formed of an Mn—Zn ferrite, an eddy current flows increasingly at a higher frequency thereby increasing a loss. Consequently, its electrical resistance (resistivity) needs to be maximized in order to enable the Mn—Zn ferrite to duly function as a magnetic core material in the highest frequency band possible. However, since the conventional Mn—Zn ferrite contains more than 50 mol % (stoichiometric composition) $Fe_2O_3$, $Fe^{2+}$ is present in a large amount, which facilitates an electron transfer between $Fe^{3+}$ and $Fe^{2+}$ (ions). As a result, the resistivity is smaller than an order of about 1 $\Omega$m, and therefore the Mn—Zn ferrite can duly function only up to several hundred kHz of frequency, from which upward the initial permeability is significantly lowered whereby its characteristics as a soft magnetic material is totally lost.

Under the circumstances, Japanese Patent Applications Laid-Open Nos. H07-230909 and H10-208926 disclose an Mn—Zn ferrite containing less than 50.0 mol % $Fe_2O_3$, and also containing CaO and SiO2 as additive in order to increase electrical resistance, and Japanese Patent No. 3108803 discloses another Mn—Zn ferrite containing less than 50.0 mol % $Fe_2O_3$, and TiO2 or SnO2, and also containing CaO and SiO2 as additive in order to increase electrical resistance.

The Mn—Zn ferrite disclosed in the aforementioned Japanese Patent Applications Laid-Open Nos. H07-230909 and H10-28926 is destined for a magnetic core material of a deflection yoke and therefore is intended to be used only up to 100 kHz of frequency (refer to the embodiments described in the Japanese Patent Applications), and it is not assured that the Mn—Zn ferrite can generate excellent magnetic characteristics (soft magnetism) in a high frequency band exceeding 1 MHz. Consequently, the Mn—Zn ferrite cannot function successfully as a magnetic core material in a high frequency band exceeding 1 MHz. The aforementioned Japanese Patent Application Laid-open No. H07-230909 indicates that the Mn—Zn ferrite can contain up to 0.50 wt % CaO and SiO2, but the examples discussed therein contain less than 0.10 wt % CaO thus none of the examples contain more than 0.20 mass % CaO. And it is described therein that $Mn_2O_3$ may be added in an amount adapted to make a total of about 50.0 mol % together with $Fe_2O_3$, but since the Mn—Zn ferrite contains 45.0 to 48.5 mol % $Fe_2O_3$, 1.4 to 5.0 mol % $Mn_2O_3$ (i.e. $Mn^{3+}$) is to be added to make 50.0 mol %. If such a large amount of $Mn^{3+}$ is contained, it is difficult for the Mn—Zn ferrite to satisfy the requirements of both the soft magnetism and the electrical resistance.

On the other hand, the Mn—Zn ferrite disclosed in the aforementioned Japanese Patent No. 3108803 contains small amounts of CaO and $SiO_2$, specifically 0.005 to 0.20 mass % CaO and 0.005 to 0.05 mass % $SiO_2$, and therefore is not quite effective in increasing the electrical resistance. If CaO and $SiO_2$ contents are increased trying to increase the electrical resistance, an abnormal grain growth occurs at sintering and the magnetic characteristics (soft magnetism) is significantly deteriorated.

SUMMARY OF THE INVENTION

The present invention has been made in light of the above problems, and it is an object of the present invention to provide an Mn—Zn ferrite which has a high electrical resistance and exhibits an excellent soft magnetism in a high frequency band exceeding 1 MHz.

In order to achieve the object, in one aspect of the present invention, an Mn—Zn ferrite includes base components of 44.0 to 49.8 mol % $Fe_2O_3$, 4.0 to 26.5 mol % ZnO, at least one of 0.1 to 4.0 mol % $TiO_2$ and $SnO_2$, 0.5 mol % or less $Mn_2O_3$, and the remainder of MnO, contains 0.20 (0.20 excluded) to 1.00 mass % CaO as additive, and has a resistivity of $1.5 \times 10^4$ Ωm or more and a surface resistance of $1.5 \times 10^7$ Ω or more.

In the aspect of the present invention, the FeO content may be 0.2 mol % or less.

In the aspect of the present invention, the Mn—Zn ferrite may further contain 0.01 to 0.10 mass % $SiO_2$ as additive.

In the aspect of the present invention, the Mn—Zn ferrite may further contain at least one of 0.01 to 0.20 mass % $V_2O_5$, 0.01 to 0.20 mass % $MoO_3$, 0.01 to 0.20 mass % $ZrO_2$, 0.01 to 0.20 mass % $Ta_2O_5$, 0.01 to 0.20 mass % $HfO_2$, 0.01 to 0.20 mass % $Nb_2O_5$, and 0.01 to 6.00 mass % CuO as additive.

Thus, since the Mn—Zn ferrite according to the present invention contains less than 50.0 mol % $Fe_2O_3$ and a limited amount (0.5 mol % or less) of $Mn_2O_3$, an abnormal grain growth does not occur even if CaO content is more than 0.20 mass %, and a high electrical resistance (a resistivity of $1.5 \times 10^4$ Ωm or more and a surface resistance of $1.5 \times 10^7$ Ω or more) can be gained. And, since an appropriate amount of $TiO_2$ and/or $SnO_2$ is contained, an initial permeability is kept adequately high, whereby an excellent soft magnetism can be achieved in a high frequency band such as 1 MHz.

DETAILED DESCRIPTION OF THE PREFFERED EMBODIMENTS

As described above, when a conventional general Mn—Zn ferrite containing more than 50.0 mol % $Fe_2O_3$ is sintered in a reducing atmosphere controlled with the constant b set at 7 to 8 in the formula (1), $Mn^{3+}$ known to deteriorate the soft magnetism is hardly produced, but $Fe^{2+}$ known to significantly lower the electrical resistance is produced because $Fe_2O_3$, (i.e. $Fe^{3+}$) in excess of 50.0 mol % is reduced. On the other hand, since an Mn—Zn ferrite of the present invention contains less than 50.0 mol %, specifically, 44.0 to 49.8 mol% $Fe_2O_3$, $Fe^2$ is hardly produced when the Mn—Zn ferrite is sintered in a reducing atmosphere controlled with the constant b set at 7 to 8 in the formula (1).

When the conventional Mn—Zn is sintered in an oxidizing atmosphere controlled with the constant b set at more than 8 in the formula (1), $Mn^{2+}$ is oxidized to produce $Mn^{3+}$. $Mn^{3+}$ distorts crystal lattice thereby significantly lowering initial permeability, and also causes electrical resistance to lower. On the other hand, since the Mn—Zn ferrite of the present invention contains appropriate amounts of $TiO_2$ and/or $SnO_2$, $Ti^{4+}$ and/or $Sn^{4+}$ is dissolved in spinel lattice, whereby $Mn^{3+}$ is reduced to produce $Mn^{2+}$.

Thus, the Mn—Zn ferrite of the present invention makes it happen that the production of $Fe^{2+}$ responsible for significantly lowering the electrical resistance is suppressed and also the production of $Mn^{3+}$ responsible for deteriorating the soft magnetism and for lowering the electrical resistance is suppressed, whereby an excellent soft magnetism and a high electrical resistance are both successfully achieved. Specifically, a resistivity of $1.5 \times 10^4$ Ωm or more, and a surface resistance of $1.5 \times 10^7$ Ω or more can be achieved. In this connection, since the Mn—Zn ferrite does not work quite effectively when containing less than 0.1 mol % $TiO_2$ and/or $SnO_2$, and works adversely so as to cause the initial permeability to lower when containing more than 4.0 mol % $TiO_2$ and/or $SnO_2$, the content of $TiO_2$ and/or $SnO_2$ is set to range from 0.1 to 4.0 mol %. Also, since the content of $Mn^{3+}$ is an important index for achieving both of an excellent soft magnetism and a high electrical resistance, the content of $Mn^{3+}$ (i.e. $Mn_2O_3$) is set at 0.5 mol % or less. Iron component, including FeO ($Fe^{2+}$), of an Mn—Zn ferrite is generally expressed as $Fe_2O_3$, and since $Fe^{2+}$ is greatly responsible for lowering electrical resistance as described above, the content of FeO is preferably set at 0.2 mol % or less.

ZnO as a base component of an Mn—Zn ferrite has an effect on Curie temperature and saturation magnetization. Specifically, too small content of ZnO causes the initial permeability to lower, while too large content thereof causes Curie temperature and saturation magnetization to lower. Since ferrite used in a power supply transformer is often exposed to a temperature of 80 to 100 degrees C., it is important that the Curie temperature and saturation magnetization be kept high, and therefore the content of ZnO is set to range from 4.0 to 26.5 mol % as described above.

The Mn—Zn ferrite of the present invention contains more than 0.20 mass % CaO as additive, as described above. CaO segregates at a crystal grain boundary and contributes to increasing electrical resistance, but when the content of CaO is more than 0.20 mass %, an abnormal grain growth occurs resulting in a significant deterioration of magnetic characteristics. So, in the conventional Mn—Zn ferrite, the content of CaO is set at 0.20 mass % or less in order to prevent an abnormal grain growth from occurring. On the other hand, in the Mn—Zn ferrite of the present invention, the content of $Fe_2O_3$ is set at 49.8 mol % (below 50.0 mol %, i.e. the stoichiometric composition) or less, and at the same time the content of $Mn_2O_3$ is set to be slight (0.5 mol % or less), and also a slight amount (0.2 mol % or less) of FeO may be contained as required, whereby an abnormal grain growth does not occur even when more than 0.20 mass % CaO is contained. The content of CaO is preferably set at more than 0.50 mass % in terms of increasing electrical resistance, but too large content thereof causes soft magnetism to be deteriorated, thus the content of CaO is set to range from 0.20 (0.20 excluded) to 1.00 mass %. $SiO_2$ is also effective in increasing electrical resistance and therefore 0.01 to 0.10 mass % $SiO_2$ may be contained as required.

The Mn—Zn ferrite of the present invention may further contain at least one of $V_2O_5$, $MoO_3$, $ZrO_2$, $Ta_2O_5$, $HfO_2$, $Nb_2O_5$, and CuO as additive. These components are effective in facilitating a sintering action and in increasing electrical resistance but not quite effective when the content is too small, while causing an abnormal grain growth when the content is too large. Accordingly, the content of $V_2O_5$, $MoO_3$, $ZrO_2$, $Ta_2O_5$, $HfO_2$, and $Nb_2O_5$ is preferably set to range from 0.01 to 0.20 mass %, and the content of CuO is set to range from 0.01 to 6.00 mass %.

The Mn—Zn ferrite of the present invention can be sintered and cooled down in a reducing atmosphere with partial pressure of oxygen controlled with the constant b of the formula (1) appropriately selected from the range of 7 to 15. This means that the atmosphere for the Mn—Zn ferrite of the present invention can be controlled easily compared to the atmosphere for the conventional Mn—Zn ferrite, for which the constant b is selected usually from the range of 7 to 8. As a result, production cost is reduced. In this connection, if the constant b is set to exceed 15, then the content of $Mn^{3+}$ in a ferrite exceeds 0.5 mol % and initial permeability is lowered rapidly.

In manufacturing the Mn—Zn ferrite of the present invention, material powders of base components $Fe_2O_3$, ZnO and MnO are weighed for a predetermined compound ratio, mixed, calcined and milled. The calcination is conducted at a temperature appropriately determined between 800 and 1000 degrees C. depending on a target composition, and the milling is conducted by a general-purpose ball mill, attritor, or the like. And the material powders subjected to the above processes are further mixed with appropriate amounts of $TiO_2$, $SnO_2$, $CaO$, $SiO_2$, and other additives as required so as to obtain a compound powder of a target composition. The compound powder is, according to the ordinary manufacturing process, granulated, for example, with addition of a binder, such as polyvinyl alcohol, polyacrylamide, methylcellulose, polyethylene oxide, glycerin, and the like, and pressed into green compacts, for example, under a pressure of 80 MPa or more. The green compacts are sintered at a temperature of 1000 to 1300 degrees C. in an atmosphere with partial pressure of oxygen controlled by charging inert gas, such as nitrogen gas, in a furnace, and cooled down in the same atmosphere. In the processes of sintering and cooling, the constant b in the formula (1) is selected from the range of 7 to 15, which provides a considerably relaxed allowance compared to the range of 7 to 8 specified for sintering the conventional Mn—Zn ferrite containing more than 50.0 mol % $Fe_2O_3$. As a result, partial pressure of oxygen can be controlled with less difficulty and trouble. And, since reaction of oxidation or reduction is negligible regardless of oxygen concentration at a temperature below 500 degrees C., the atmosphere does not have to be controlled according to the formula (1) after the atmosphere temperature cools down below 500 degrees C.

EXAMPLES 11 different kinds of test samples including 4 comparative samples were produced using components as shown in Table 1. Material powders of $Fe_2O_3$, ZnO and MnO were mixed, agitated by an attritor, calcined in the air at 850 degrees C. for 2 hours, and milled by an attritor for 1 hour, and a compound powder was gained. Then, powders of $TiO_2$, $SnO_2$, CaO, $SiO_2$, CuO, $Nb_2O_5$, and $V_2O_5$ are appropriately added to the compound powder for component adjustment, and the adjusted compound powder was agitated by an attritor for 1 hour, granulated with addition of polyvinyl alcohol, and pressed under a pressure of 80 MPa into toroidal cores (green compacts) each having an outer diameter of 25 mm, an inner diameter of 15 mm and a height of 5 mm. The green compacts were sintered at 1200 degrees C. for 2 hours and then cooled down in a furnace where an atmosphere was controlled by charging nitrogen in the furnace so as to have partial pressure of oxygen obtained by setting the constant b in the formula (1) at 9, and invention samples 1 to 7 and comparative samples 1 to 4 were obtained.

A fluorescent X-ray analysis was performed on the samples produced as above to look into respective final component compositions, and their $Mn_2O_3$ and FeO content amounts were determined titrimetrically and shown in Table 1. And their initial permeability at 1 MHz, resistivity and surface resistance were measured and shown in Table 2.

TABLE 1

| Sample Classification | Base Component (mol %) | | | | | Titration Component (mol %) | | Additive Component (mass %) | | |
|---|---|---|---|---|---|---|---|---|---|---|
| | $Fe_2O_3^{(1)}$ | $MnO^{(2)}$ | ZnO | $TiO_2$ | $SnO_2$ | $Mn_2O_3$ | FeO | CaO | $SiO_2$ | Others |
| Comparative 1 | 51.0 | 36.7 | 12.2 | 0.1 | — | 0.9 | 1.0 | 0.10 | 0.04 | — |
| Invention 1 | 49.8 | 37.6 | 12.5 | 0.1 | — | 0.3 | 0.2 | 0.25 | " | — |
| Invention 2 | 47.0 | 39.0 | 13.0 | 1.0 | — | 0.1 | 0.1 | 1.00 | " | — |
| Comparative 2 | " | " | " | " | — | " | " | 1.50 | " | — |
| Invention 3 | " | " | " | " | — | " | " | 0.60 | — | CuO: 1.00 |
| Invention 4 | " | " | " | " | — | " | " | " | — | $Nb_2O_5$: 0.05 |
| Invention 5 | " | " | " | — | 1.0 | " | " | " | — | $V_2O_5$: 0.05 |
| Invention 6 | " | " | " | — | 1.0 | " | " | " | 0.04 | $ZrO_2$: 0.05 |
| Comparative 3 | " | 39.8 | 13.2 | — | — | 0.6 | 0 | " | " | — |
| Comparative 4 | " | 35.8 | 12.2 | — | 5.0 | 0 | 0.3 | " | " | — |
| Invention 7 | 44.0 | 38.8 | 13.2 | 4.0 | — | 0 | 0 | 0.80 | " | — |

Notes:
$^{(1)}Fe_2O_3$ refers to FeO as well as $Fe_2O_3$
$^{(2)}$MnO refers to $Mn_2O_3$ as well as MnO

TABLE 2

| Sample Classification | Initial Permeability | Resistivity ($\Omega$m) | Surface Resistance ($\Omega$) |
|---|---|---|---|
| Comparative 1 | 30 | $1.1 \times 10^1$ | $1.2 \times 10^2$ |
| Invention 1 | 720 | $1.6 \times 10^4$ | $1.7 \times 10^7$ |
| Invention 2 | 820 | $7.7 \times 10^4$ | $9.1 \times 10^7$ |
| Comparative 2 | 450 | $1.1 \times 10^5$ | $1.3 \times 10^8$ |
| Invention 3 | 790 | $3.8 \times 10^5$ | $2.9 \times 10^8$ |
| Invention 4 | 800 | $3.5 \times 10^5$ | $2.7 \times 10^8$ |
| Invention 5 | 890 | $3.6 \times 10^5$ | $2.6 \times 10^8$ |
| Invention 6 | 830 | $3.4 \times 10^5$ | $2.6 \times 10^8$ |
| Comparative 3 | 380 | $1.2 \times 10^4$ | $1.4 \times 10^7$ |
| Comparative 4 | 330 | $1.3 \times 10^4$ | $1.4 \times 10^7$ |
| Invention 7 | 810 | $4.4 \times 10^4$ | $3.2 \times 10^8$ |

As seen from Tables 1 and 2, all the invention samples 1 to 7 contain less than 0.5 mol % $Mn_2O_3$ and 0.2 mol % or less FeO, and also have an initial permeability of more than 700, a resitivity of more than $1.5 \times 10^4$ $\Omega$m, and a surface resistance of more than $1.5 \times 10^7$ $\Omega$, which proves that an excellent soft magnetism and a high electrical resistance are gained.

On the other hand, comparative sample 1 is formed of a conventional general Mn—Zn containing more than 50.0 mol % $Fe_2O_3$ and therefore has its electrical resistance significantly lowered, comparative sample 2 contains much CaO, therefore incurs an abnormal grain growth and has its initial permeability significantly lowered, comparative sample 3 does not contain $TiO_2$ nor $SnO_2$, thus has much $Mn_2O_3$ (i.e. $Mn^{3+}$) existing therein and therefore has its soft magnetism deteriorated and its electrical resistance lowered, and comparative sample 4 contains too much $SnO_2$ and therefore has its soft magnetism deteriorated and its electrical resistance lowered.

While the present invention has been explained with respect to specific embodiments thereof, it is to be understood that the present invention is by no means limited thereto but encompasses all changes and modifications which will become possible within the scope of the appended claims.

What is claimed is:

1. An Mn—Zn ferrite: including base components of 44.0 to 49.8 mol % $Fe_2O_3$, 4.0 to 26.5 mol % ZnO, at least one of 0.1 to 4.0 mol % $TiO_2$ and $SnO_2$, 0.5 mol % or less $Mn_2O_3$, and a remainder of MnO; containing 0.20 (0.20 excluded) to 1.00 mass % CaO as additive; containing 0.01 to 0.01 mass % $SiO_2$ as additive; and having a resistivity of $1.5 \times 10^4$ Ωm or more and a surface resistance of $1.5 \times 10^7$ Ω or more.

2. An Mn—Zn ferrite according to claim 1, wherein FeO content is 0.2 mol % or less.

3. An Mn—Zn ferrite according to claim 1, further containing at least one of 0.01 to 0.20 mass % $V_2O_5$, 0.01 to 0.20 mass % $MoO_3$, 0.01 to 0.20 mass % $ZrO_2$, 0.01 to 0.20 mass % $Ta_2O_5$, 0.01 to 0.20 mass % $HfO_2$, 0.01 to 0.20 mass % $Nb_2O_5$, and 0.01 to 6.00 mass % CuO as additive.

4. An Mn—Zn ferrite according to claim 2, further containing at least one of 0.01 to 0.20 mass % $V_2O_5$, 0.01 to 0.20 mass % $MoO_3$, 0.01 to 0.20 mass % $ZrO_2$, 0.01 to 0.20 mass % $Ta_2O_5$, 0.01 to 0.20 mass % $HfO_2$, 0.01 to 0.20 mass % $Nb_2O_5$, and 0.01 to 6.00 mass % CuO as additive.

* * * * *